United States Patent [19]

Masuda et al.

[11] 4,167,911

[45] Sep. 18, 1979

[54] APPARATUS FOR SEPARATION AND TRANSPLANTING PAPER TUBE SEEDLINGS FROM A CONTINUOUS PAPER TUBE SEEDLING ASSEMBLY

[75] Inventors: Akiyoshi Masuda; Tetsuo Nambu, both of Obihiro, Japan

[73] Assignee: Nippon Tensai Seito Kabushiki Kaisha, Tokyo, Japan

[21] Appl. No.: 849,441

[22] Filed: Nov. 7, 1977

Related U.S. Application Data

[62] Division of Ser. No. 768,749, Feb. 15, 1977, Pat. No. 4,132,337.

[30] Foreign Application Priority Data

Mar. 2, 1976 [JP] Japan .................................. 51-21766
Nov. 12, 1976 [JP] Japan ................................. 51-135138

[51] Int. Cl.² ........................ A01C 11/02; A01G 9/02; B26F 3/02
[52] U.S. Cl. .......................................... 111/3; 47/73; 225/100
[58] Field of Search ................ 111/2, 3, 4, 5, 6, 7, 111/77, 34, 85; 225/100; 47/84, 85, 86, 87, 56, 57.5, 73–78

[56] References Cited

U.S. PATENT DOCUMENTS

| 1,192,140 | 7/1916 | Werstler | 111/3 X |
|---|---|---|---|
| 3,375,607 | 4/1968 | Melvold | 47/74 |
| 3,508,693 | 4/1970 | Rossi | 225/100 X |
| 3,515,036 | 6/1970 | Oki et al. | 93/1 |
| 3,611,634 | 10/1971 | Dalton | 47/77 |
| 3,675,542 | 7/1972 | Torigoe | 225/100 |
| 3,881,645 | 5/1975 | Kopp | 225/100 X |
| 3,906,875 | 9/1975 | Kesinger et al. | 111/2 |

FOREIGN PATENT DOCUMENTS

| 157309 | 12/1904 | Fed. Rep. of Germany | 225/100 |
|---|---|---|---|
| 849197 | 7/1952 | Fed. Rep. of Germany | 111/3 |
| 2330600 | 5/1974 | Fed. Rep. of Germany | 111/2 |
| 1219366 | 1/1971 | United Kingdom | 111/2 |

Primary Examiner—Edgar S. Burr
Assistant Examiner—James R. Feyrer
Attorney, Agent, or Firm—Browdy and Neimark

[57] ABSTRACT

The present invention relates to a method wherein seedlings, raised in a paper tube assembly connected together by means of connecting portions having a separating line forming the separation course in each, are continuously pulled out while separating the tubes one by one and planting them in the field. In the separation of seedling tubes, a transplanter is provided with rollers for pulling out continuous seedling tubes and other rollers for separating the pulled out seedling tubes into individual seedling tubes. The latter has a faster rotating speed than that of the former and has a cone-like shape or is mounted so as to incline with respect to the former, thereby separating paper tubes into individual pot bodies at the connecting portions, one by one, while moving the separation acting points progressively. The separating-line in each connecting portion has an unjoined separation-guiding-portion extending from one end to 20-70% of the height of the connecting portion. Joined and unjoined portions are distributed over the remainder of the height.

12 Claims, 21 Drawing Figures

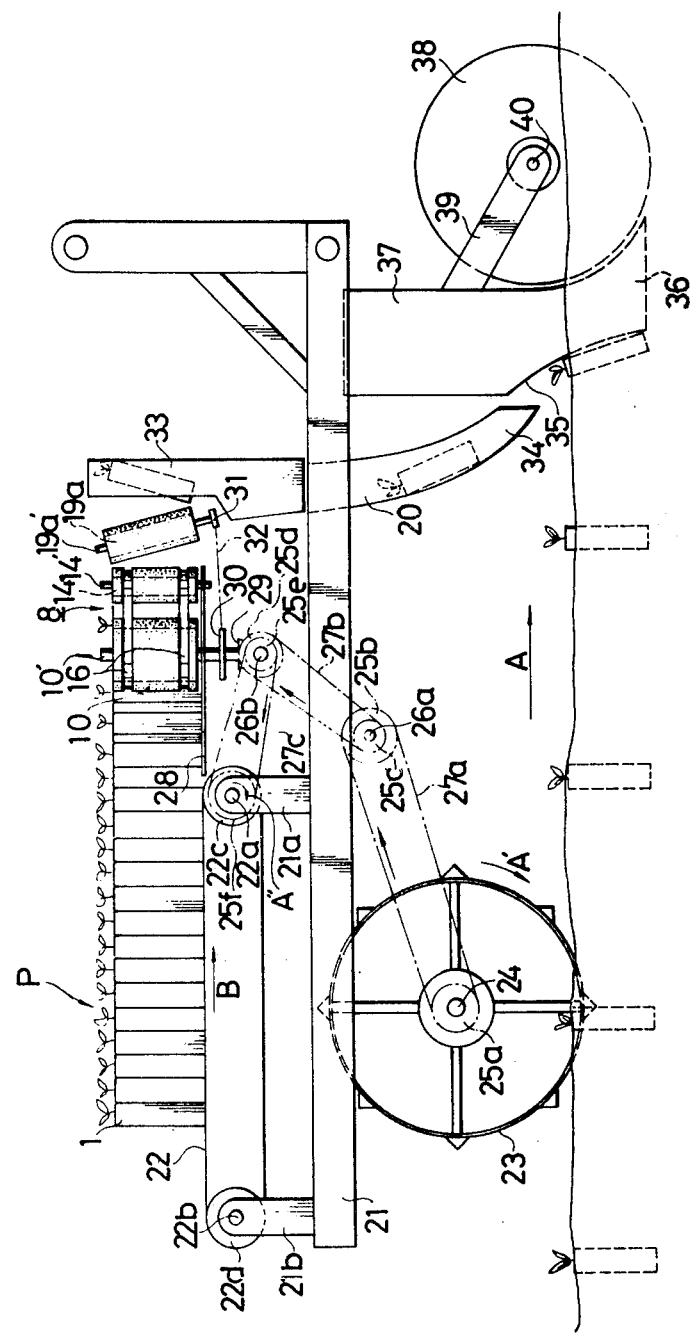

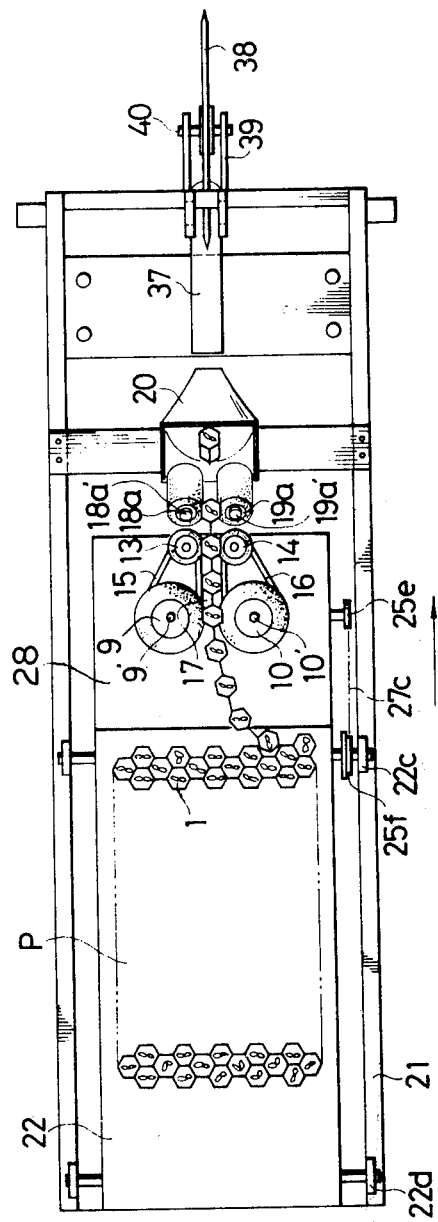

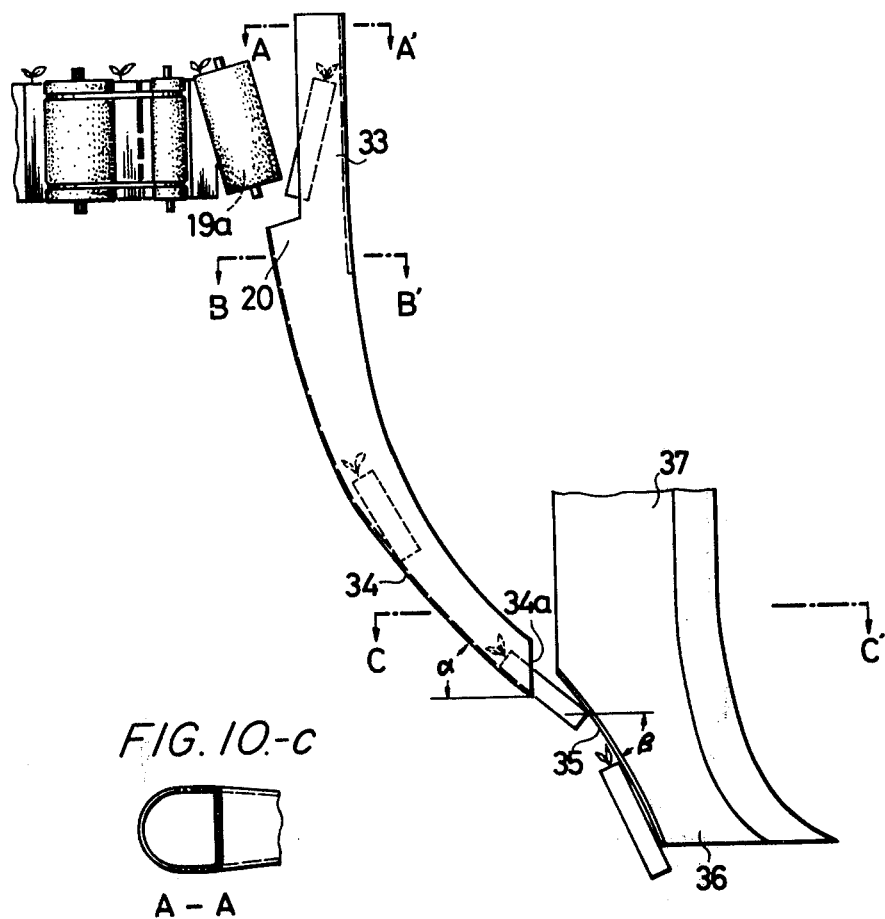
FIG. 10-a
FIG. 10.-c
A – A
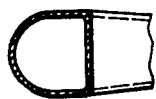
FIG. 10.-d
B – B
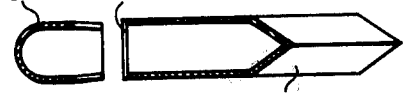
FIG.10.-b
C – C FIG. 11-a
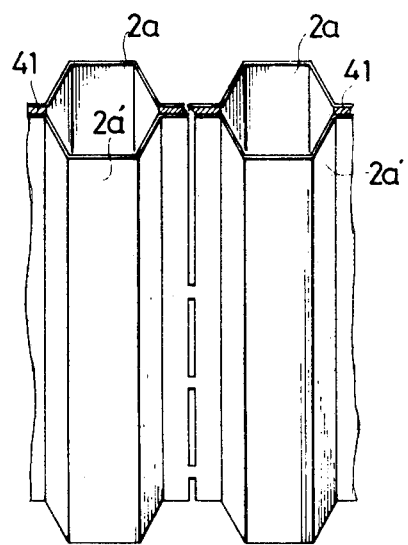
FIG. 11-b
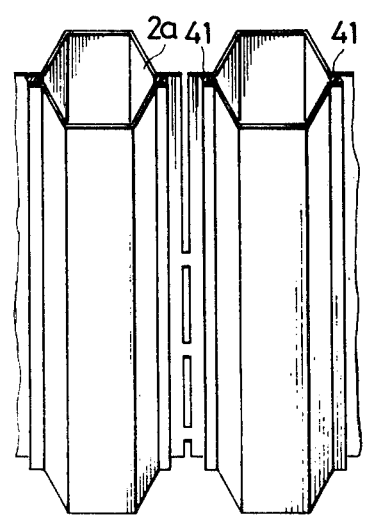
FIG. 11-c
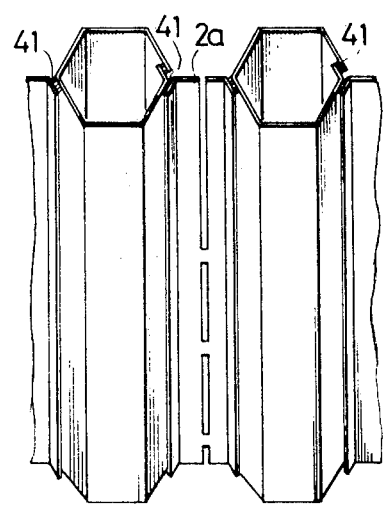

FIG. 11-f
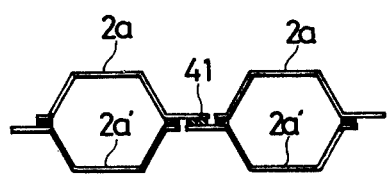
FIG. 11-g
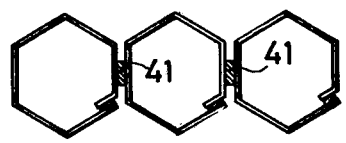
FIG. 11-d
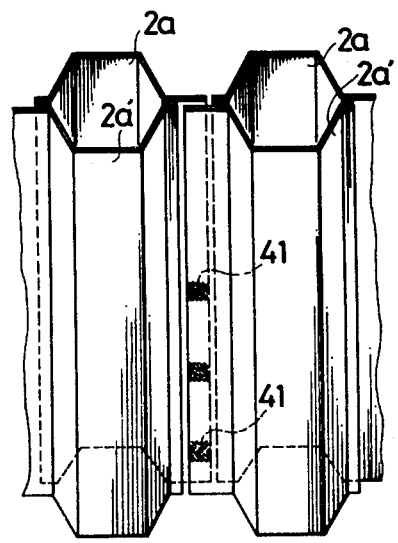
FIG. 11-e
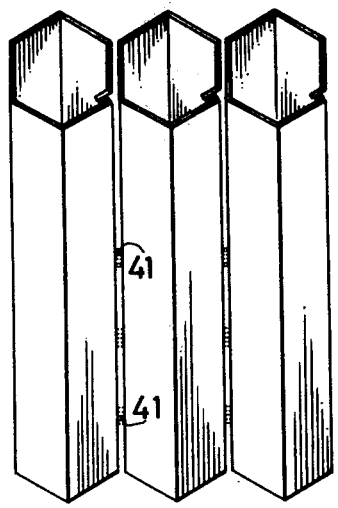

APPARATUS FOR SEPARATION AND TRANSPLANTING PAPER TUBE SEEDLINGS FROM A CONTINUOUS PAPER TUBE SEEDLING ASSEMBLY

This is a division of application Ser. No. 768,749 filed Feb. 15, 1977, now U.S. Pat. No. 4,132,337.

The present invention relates to a continuous paper tube assembly adapted to be continuously pulled out and separated into individual seedlings for planting, a method of separating this paper tube assembly, a seedling transplanting apparatus provided with a device for separating this paper tube assembly and a planting device.

The continuous paper tube assembly of the present invention is one in which individual paper tubes are connected like a strip and thus made into a row of paper tubes. The row of paper tubes is folded at every preselected length alternately right and left in a meandering way, so that it can be pulled out continuously in a row from one end toward the other end thereof. In the connecting portion of adjacent individual paper tubes in said row, a separating line, forming a separation course, is set. A separation-guide portion is provided at the upper end portion, or the lower end portion or both upper and lower end portions of the separating-line, and thereby the said connecting portion has a sufficient strength to resist against the pulling-out of its own seedling row of the paper tubes after the nursing of seedlings but is easily separated by instantaneous mechanical pulling. It is very easily separated into individual paper tube seedlings by the use of a separating device wherein it is nipped by means of rotary bodies which are adapted to move the separation acting point successively, particularly from the separation-guide-portion as from the upper to the lower or from the lower to the upper in the course of time along the separating line. A further object of the present invention is that in the case of placing and planting individual paper tube seedlings, continuously separated by means of a separating mechanism, as described above, from the row like paper tube seedlings through a delivery tube onto the field, the seedlings are buried in given positions, generally in a perpendicular situation, by means of a seedling delivery tube mounted with an inclination to the progressing direction with respect to the vertical position and a seedling control plate mounted corresponding to the exit of said seedling delivery tube. Another object of the present invention is to remove the overload on the connecting body of the paper cylinder assembly by controlling the distance between the pulling-out position of the grouped paper tube seedlings and a supply device so as to make it always constant thereby preventing the cutting-off of the continuous body in the course of pulling-out due to the pulling-out resistance. Furthermore the seedlings are prevented from falling sideways, resulting in attaining the continuous transplantation.

The present assignee has previously developed a paper tube assembly connected with each other as shown in U.S. Pat. No. 3,515,036. When the paper tube assembly pot bodies are placed on an automatic transplanting machine and each paper tube row is separated into individual seedlings, personal hands are used or a separating mechanism with a cutting blade is required, and accordingly, in the case of the latter, the connecting portions are cut mechanically under the pulled condition at all times. Thus, if a break of the blade occurs, the cutting will be made difficult for a long time. As a result, there was a drawback in the seedling separating method by the use of personal hands or a cutting blade in that continuous planting operation of the continuous assembled paper cylinder seedlings became impossible, thus resulting in an inefficient operation.

The present inventors have completed a very practical invention hereinafter described in order to solve such problems of the prior art operation as a result of studying the construction and separation method of the paper tubes and the transplanting machine for carrying out said method, and the relationship therebetween.

The start of the study related to the construction of the connecting portions of the continuous paper tube assembly mutually connected thereby. The inventors had various experiments about how to rationally separate these connecting portions, and as a result found that in the case of a connected type paper tube assembly wherein the connecting portions were composed of connecting portions and said connecting portions had separation lines composed of needle holes of a sewing machine or slits formed at certain intervals in the vertical directions, they could resist against the parallel pulling separation in the horizontal direction to a great degree, but they could be separated by a small force in such a separation that only the upper end or lower end was pulled in one direction, namely, the separation acting point was moved from the upper end downward or from the lower end upward, as is obvious from Table 1.

Table 1

| Arrangement of connecting portion (uncut portion) (mm) (point) | Construction and Tensile Strength | | |
|---|---|---|---|
| | Horizontal tensile strength (A) (kg) | Tensile Strength in the course of time (B) (kg) | B/A × 100 (%) |
| 2 × 12 | 3.38 | 0.81 | 24 |
| 4 × 6 | 3.48 | 0.80 | 23 |
| × 4 | 3.36 | 0.84 | 25 |
| 8 × 3 | 3.53 | 1.34 | 38 |
| 12 × 2 | 3.30 | 1.85 | 56 |
| 24 × 1 | 3.45 | 2.69 | 78 | wherein the paper tube subjected to the experiment is a paper tube (Nitten paper pot: trade name) having a longer diameter of 19 mm of a hexagonal pot body in section, a height of 130 mm of the pot body and a breadth of 9.5 mm of the connecting body, and made of kraft paper subjected to rot-proof treatment.

In Table 1, the horizontal tensile strength (A) means a maximum load at the time of separation of the paper cylinder in such a way that in two pot bodies connected together seedlings are nursed under the usual seedling nursing condition and after the comletion of the nursing, the seedlings and the soil are taken out therefrom and instead of them hexagonal poles made of aluminum having a shape corresponding to that of the paper cylinder space are inserted in said pot bodies, and one of the paper tubes having the aluminum poles therein is fixed and the other is applied with a horizontal tensile load thereby causing the separation.

The tensile strength in the course of time (B) means a maximum load at the time of separation of the paper tube in such a way that one of the same paper tubes as in (a) having the aluminum poles inserted therein, is fixed, and the other is applied with a tensile load only at its upper end portion thereby causing separation (in this case the separation proceeds in V-shape). Namely, when the distance between the slits of the separation line of the connecting portion between the paper tubes is changed appropriately and the joined portions (uncut portions) are distributed from one point to several points, respectively, the horizontal tensile strength (A) does not change, but the tensile strength in the course of time (B) decreases apparently and it is found that even if the tensile strength in the course of time (B) is about 25% of the horizontal tensile strength (A), the paper tubes can be separated sufficiently, and there is little difference when the joined portion between the slits forming the separation line is below 6 mm. On the contrary, if it becomes over 6 mm, there may be the case that the tensile strength becomes larger than the crushing strength of the paper tube, and as a result, the paper tubes are damaged. Accordingly, 2-6 mm is optimum for the joined portions. Furthermore, it has been found that if the uppermost portion of the slit of the separating-line contacts the upper edge of the connecting portion of the paper tube, the separation into each paper tube seedling becomes very good, so that the whole length of the joined portion (uncut portion) of the connecting portion between the paper tubes is defined to 36 mm and this is divided into six joined portions each having the length of 6 mm thereby changing the distribution pattern in various ways. Thus the tensile strength by the separation method, wherein the separation acting point moves in the course of time, and the tensile strength obtained by pulling horizontally was compared and studied, the results being shown in Table 2. As is obvious from the Table 2, the slit contacting with the upper edge of the connecting portion acts as the separation-guide-portion apparently, and the length of this separation-guide-portion is preferably 20–70% of the height of the connecting portion even if in the ideal condition, and practically it is preferable to be 30–40%, and when the connecting portion has such a construction and the paper tubes are connected together thereby, the mechanical separation becomes easy for the first time. Namely the inventors have found, from the results and knowledge of said Tables 1 and 2, the fact that in the cast of the paper tube assembly connected by means of connecting portions so as to permit the continuous pulling-out thereof, if there are provided slits each having a preselected length from the upper edge of each paper tube connecting portion in the vertical direction inclusive of the upper edge thereby forming the separation-guide-portions, and in addition other slits are provided at preselected intervals from said guide portions linearly, thereby forming the separating-lines and thus the separation acting point is moved in the course of time from above downward, along the separating-lines, the continuous paper tube assembly seedlings can be continuously separated by a very small tensile force. The present invention was obtained on the basis of such knowledge.

Table 2

| Relation between dispersion condition of jointed portions between pot bodies of continuous assembly pot bodies and separation efficiency (total length of joined portions: 36mm) | |
| --- | --- |
| Defined dispersion condition of total sum joined portions: 36mm (Dispersion on the whole length of 13cm | Length of holding part of upper end: cm |
| | 0 |
| for No. 1 beet) (Dispersion except upper end of 0.5cm) | 0.5 |
| Dispersion except 1 cm | 1 |
| Dispersion except 2 cm | 2 |
| Dispersion except 3 cm | 3 |
| Dispersion except 4 cm | 4 |
| Defined dispersion condition of total sum joined portions: 36mm | Length of holding part of upper end: cm |
| Dispersion except 5 cm | 5 |
| Dispersion except 6 cm | 6 |
| Dispersion except 7 cm | 7 |
| Dispersion except 8 cm | 8 |
| Dispersion except 9 cm | 9 |
| Length of unjoined portion within dipersion: cm | *Number of pieces of separation miss: % |
| 1.56 | 35 |
| 1.48 | 18 |
| 1.40 | 10 |
| 1.23 | 5 |
| 1.07 | 3 |
| 0.70 | 0 |
| 0.73 | 0 |
| 0.57 | 0 |
| 0.40 | 0 |
| 0.23 | 0 |
| 0.06 | 0 |
| Number of time of break of pulled out seedling row | Tensile strength in the course of time kg | Horizontal tensile strength kg |
| 0 | 1.3 | 2.5 |
| 0 | 1.1 | 2.4 |
| 0 | 1.0 | 2.5 |
| 0 | 0.8 | 2.4 |
| 0 | 0.7 | 2.4 |
| 0 | 0.5 | 2.5 |
| 0 | 0.4 | 2.3 |
| 0 | 0.4 | 2.1 |
| 5 | 0.5 | 2.0 |
| 15 | 0.6 | 1.9 |
| 40 | 0.5 | 2.0 |

*From ones getting out in rows unseparated to such ones wherein two pots are connected together, all are counted in number and converted into %.

Namely, the connecting portions of the continuous-type paper tube assembly used in the present invention is one provided with a slit forming the separation-guide-portion of a given length, formed by cutting in vertically from the upper edge of the connecting body, and a separating-line having slits at given intervals linearly below said slit, and by means of joined portions (uncut portions) between slits the paper tubes on both sides are connected together, and the total length of said joined portions is little longer than the total length of the slits. As the apparatus for separating this continuous type paper tube assembly individually, two rollers each having different diameters at the upper and lower portions thereof like cone shape are rotated at a speed larger than the delivery speed of the continuous paper tube rows, thereby nipping them, with the result that in the paper tube connecting portion, the separation acting point is successively moved from above downward along the separating-line thereby dividing the connecting portion. Thus the connecting portion having the separation-guide portion can be very easily divided with little tensile force, so that the paper tube body is no longer damaged, and in addition, since the separation can be performed by means of a simple construction in which only rollers are rotated, mechanical continuous operation can be performed without any trouble. In the case the paper tube seedlings separated as described above are planted in the field, said connecting portion separating mechanism is mounted on a transplanter comprising a seedling drop pipe and carrier having an opener for forming a planting furrow below said seedling delivery tube. Also, in order to guide the separated paper cylinder seedlings correctly to the field surface, a seedling limiter is mounted at the upper portion of said seedling delivery tube and a seedling control plate is provided behind said opener corresponding to the exit of the seedling delivery tube, said control plate being disposed at an angle larger than the attaching angle of the seedling delivery tube with respect to the horizontal direction, and thus the planting operation can be performed at a very high efficiency with correct planting position and plant spacing. As described above, the present invention has been completed by providing the connecting portion of the paper tubes having the separation-guide-portion and the separation line and also by uniting the separating mechanism, wherein the separation acting point for separating such a connecting portion is moved in the course of time, with a transplanter having the seedling limiter and the seedling control plate mounted thereon as one body.

Hereinafter, the invention will be explained more in detail with reference to the accompanying drawings, wherein.

Figure 8:
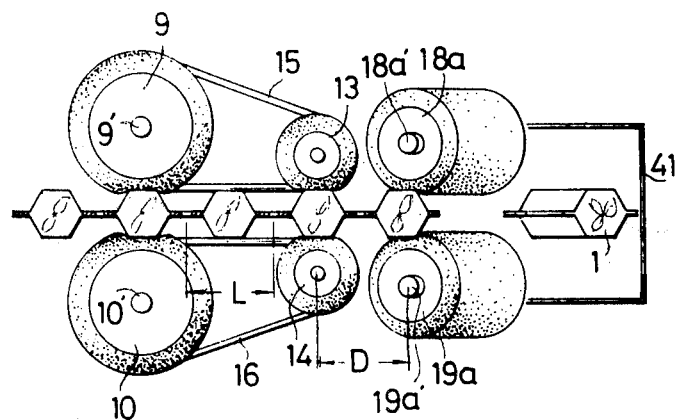
Figure 9:
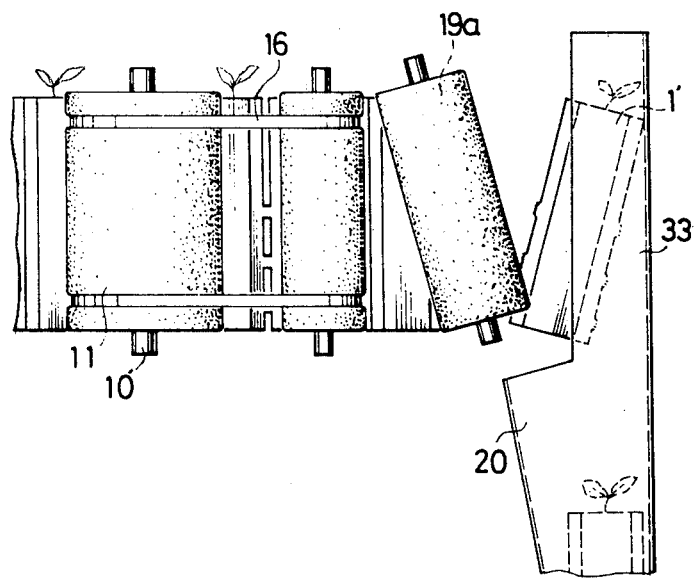

FIG. 7-a is a side view of a transplanter for carrying out the present invention;

FIG. 7-b is a plan view of FIG. 7-a;

FIG. 8 is a detailed plan view showing the separating portion of FIGS. 7-a and 7-b;

FIG. 9 is a side view of FIG. 8;

FIG. 10-a is a side view of a seedling planting device;

FIG. 10-b is a cross-sectional view taken along the line C—C' of FIG. 10-a;

FIG. 10-c is a cross-sectional view taken along the line A—A' of FIG. 10-a;

FIG. 10-d is a cross-sectional view taken along the line B—B' of FIG. 10-a;

FIGS. 11-a through 11-e are perspective views showing various embodiments of the connecting systems of the connecting portion; and FIGS. 11-f and 11-g are plan views of FIG. 11-d and 11-c, respectively.

In the drawings, P is a continuous paper tube assembly seedling body, 1 is an individual paper tube constituting a connecting paper tube assembly, 2 is a film constituting the paper tube 1, which is made of a paper material such as kraft paper etc. usually having rot-proof properties of such a degree that during the period of the nursing of seedlings no decomposition occurs. Hexagonal or square hollow paper tubes 1 are made from this film 2. 3 is a connecting portion adapted to connect individual paper tubes 1 mutually, and said connecting portion is usually made of the same material as that used for the paper tubes 1, but any material can be used therefor if it can produce the same effect as described above. In order to dispose the connecting portions between the adjacent paper tubes 1, two sheets of film 2 forming the paper tubes are pasted thereto at preselected intervals or, as shown in U.S. Pat. No. 3,515,036, it may be attained in such a way that paper tubes 1 are previously formed and then the films of a given breadth provided separately are pasted to said paper tubes, said films being of the same material as that of the paper tube or different therefrom. Any other appropriate method can be adopted for said object. 4 is a slit which contacts with the upper edge 3' of the connecting portion 3 and is formed vertically inclusive of said upper edge, and this slit 4 constitutes the separation-guide-portion for facilitating the division of the connecting portion. 5 are other slits provided below the separation-guide-portion 4, linearly at preselected intervals. 6 are uncut portions, namely joined portions existing between the slits 5, and thus the separation line 6' is formed by the sequence of said slits 5 and joined portions 6. Accordingly, the greater part of the connecting portion 3 is cut in the vertical direction, so that the paper tubes 1,1 are connected together via the joined portions 6 being left. Accordingly, the characteristics of the connected paper tube assembly of the present invention lie in the total length of the joined portions 6 and how to dispose them in the dispersed relation. Namely, in order to pull out the connected paper tube assembly seedling bodies P after the seedling nursing in a row, the connecting bodies have a sufficient strength therefore, but they are required to be easily separated without any resistance in the subsequent dividing step. The connecting body 3 which satisfies such a condition is of the construction of the connecting body described previously with reference to the experimental examples, wherein the length of the separation-guide-portion 4 is within the range of 20 to 70% of the height H of the connecting portion 3 even if in ideal status, and more preferably within the range of 30 to 40% thereof. Also, below the separation guide portion 4 the slits 5 and the joined portions 6 are alternately arranged linearly. In this case, the total length of the joined portion 6 is formed in such a way that the lengths within a range of above 30 to 80% of the height H of the connecting body 3 are appropriately dispersed. The separation guide portion 4 may be provided at the upper edge portion or the lower edge portion of the connecting portion 3 correspondingly of the separation mechanism individually, or it may be provided at both of the upper and lower portions, and the separation line 6' may be suitably arranged in accordance with the arrangement of the separation-guide-portion 4.

Numeral 7 is seedlings nursed in the paper tubes, 8 is a paper cylinder separating device, and 9 and 10 are guide rollers which are fixed on shafts 9' and 10', respectively, and each covered by an elastic body 11 such as sponge on the periphery thereof. Both rollers 9, 10 confront each other with an interval which allows the rollers to nip the paper tube 1. The shafts 9', 10' are connected to a power source thereby obtaining the driving force. 13 and 14 are follower rollers which are covered by an elastic body 11 on their peripheries like the guide rollers. 15 and 16 are belts, wherein the belt 15 is stretched between the rollers 9, 13 and the belt 16 is between the rollers 10, 14. These belts 15 and 16 run in the direction of the arrows respectively, and between the belts 15, 16 a paper tube row supply path 17 is formed. 18 and 19 are separating rollers which are fixed on shafts 18' and 19', respectively, and are covered by an elastic body 11 such as sponge on their peripheries and are of a cone shape having the upper end of a larger diameter and the lower end of a smaller diameter. The separating rollers are constructed such that the larger diameter portion thereof has a peripheral speed faster than the linear speed of the belts 15, 16, and mounted opposite to each other at the exit of the paper tube row supply path 17.

The paper tube separating device 8 is constructed as described above, wherein the row of the paper tubes 1 progresses on the paper tube supply path 17 progressively by the belts 15, 16 rotating at a constant speed and at the exit thereof the leading paper tube 1a is nipped by the separation rollers 18 and 19, and in this case the separating rollers are constructed such that the rotary speed thereof is larger than that of the belts 15, 16 of the paper tube supply path 17 and the diameter of the upper portions of said separating rollers are larger than that of the lower portions thereof, so that the upper portions have a faster peripheral speed than the lower portions, and accordingly the connecting portions 3 of the paper tubes 1a are progressively separated in the course of time by means of the separating rollers 18, 19, and the separated paper tubes 1a are progressively planted by means of an appropriate planting mechanism, and if the drop pipe 20 is mounted below the separating rollers 18, 19, the paper tubes 1a can be planted in the field by the natural drop action, so that the connection type paper tube seedlings can be automatically separated into individual paper tube seedlings 1 by repeating said operations successively.

Figure 1:
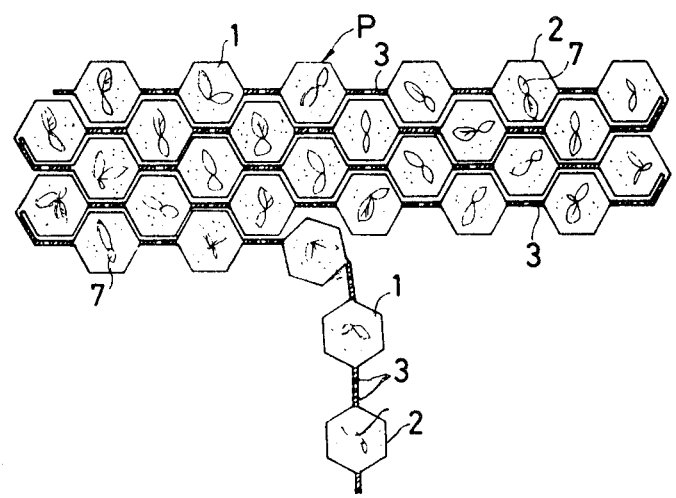
FIG. 1 is a plan view showing the situation in which the continuous paper tube assembly seedlings, after the completion of nursing of seedlings are pulled out from one end thereof.
Figure 2:
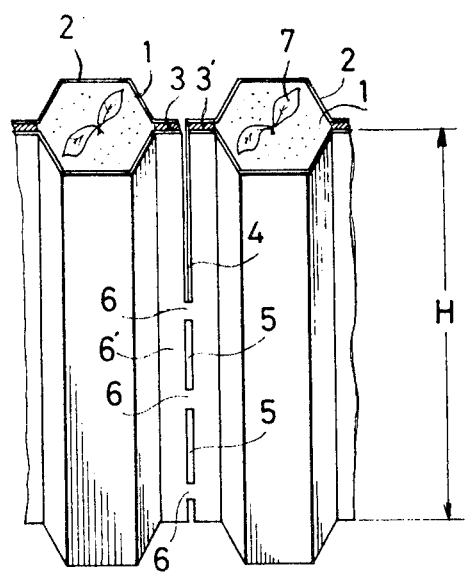
FIG. 2 is a perspective view partly in detail, showing the continuous paper tube assembly of FIG. 1.
Figure 3:
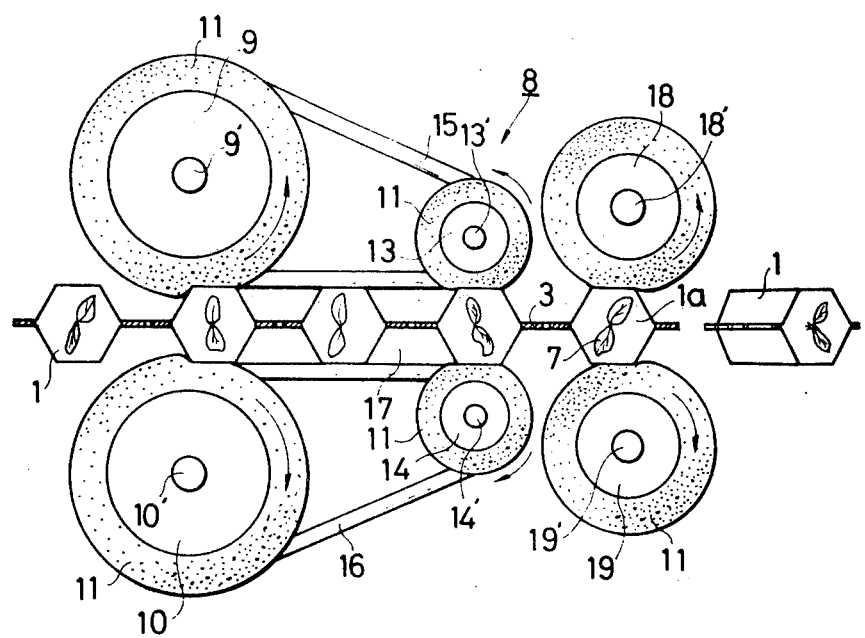
FIG. 3 is a plan view of the main part of the separating mechanism for dividing the connecting portion of the continuous paper tube assembly of FIG. 1.
Figure 4:
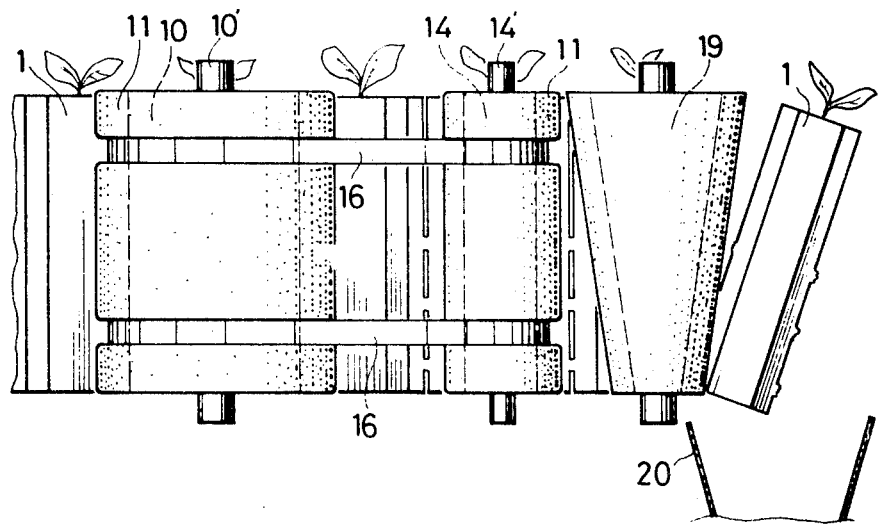
FIG. 4 is a side view of FIG. 3.
Figure 5:
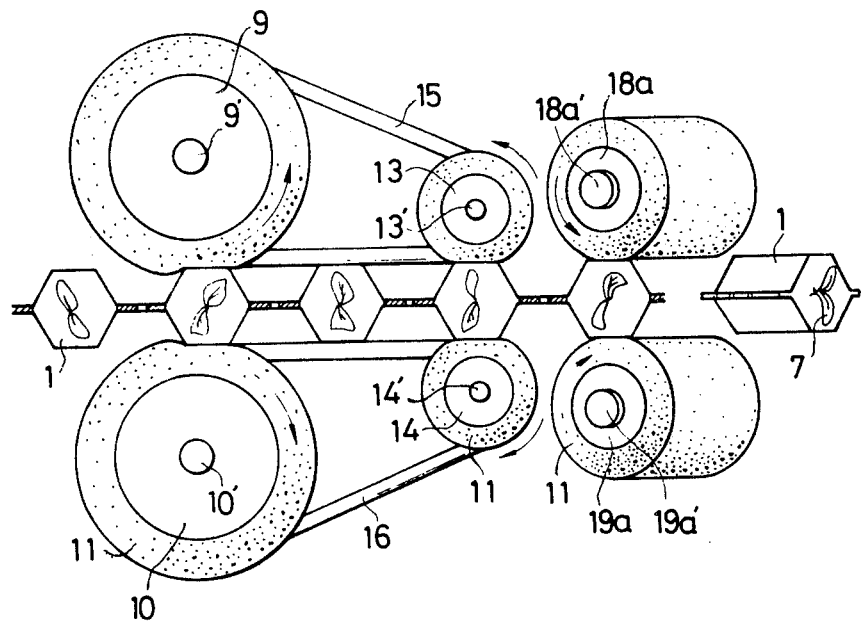
FIG. 5 is a plan view showing another embodiment of the separating device of FIG. 3.
Figure 6:
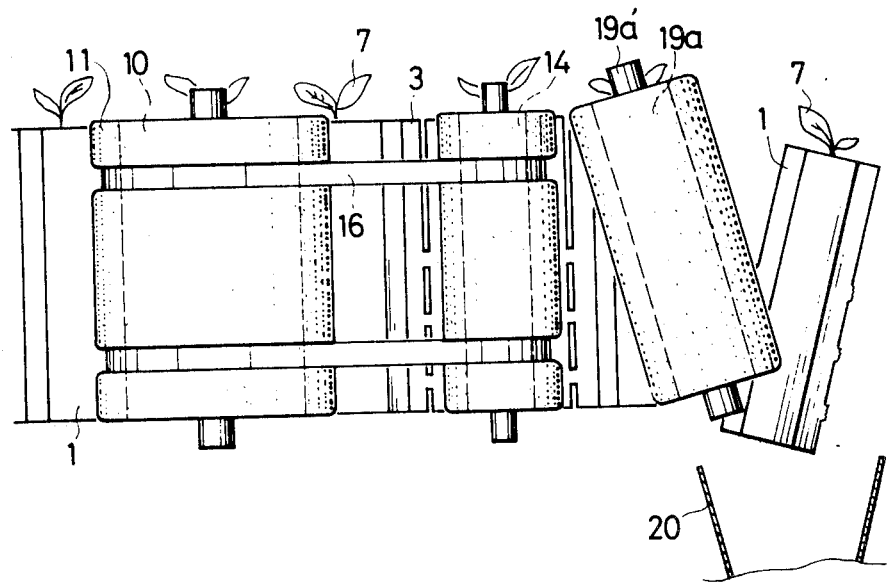
FIG. 6 is a side view of FIG. 5.

FIGS. 5 and 6 show another embodiment wherein the separating rollers are a pair of cylindrical rollers 18a, 19a each having the same diameter from the upper end to the lower end thereof, and these rollers are mounted so as to incline at a certain angle to the parallel pulling-out direction of the paper tube seedling row thereby producing a substantial difference between the tensile forces of the upper and lower ends of the paper tube row contacting with the rolls 18a, 19a, resulting in arising the same effect as that in the case of said cone rollers 18, 19. As described above, in the present invention any device can be used if it can produce a substantial difference of the pulling-out force between the upper and lower ends with respect to the connecting body 3.

FIGS. 7a and 7b show a transplanting machine for carrying out the method of the present invention, wherein 21 is a machine frame, 22 is a belt conveyor for putting the connected paper tube assembly P thereon, which conveyor is stretched between a drive pulley 22c and a driven pulley 22d, which are fixed on shafts 22a and 22b respectively, said shafts being supported on support rods 21a and 21b mounted on the machine frame 21 respectively. 23 are wheels which are mounted on a shaft 24 rotatably mounted on the machine frame 21. 25a, 25b . . . 25f are chain sprockets, and the chain sprocket 25a is mounted on the shaft 24, the chain sprockets 25b, 25c on a shaft 26a, the chain sprockets 25d, 25e on a shaft 26b, and the chain sprocket 25f on the drive pulley shaft 22a respectively. 27a, 27b and 27c are chains, and the chain 27a is stretched between the chain sprockets 25a and 25b, the chain 27b between the chain sprockets 25c and 25d and the chain 27c between the chain sprockets 25e and 25f, respectively.

Using such chain sprocket and chain mechanism, in the case of the transplanting machine travelling in the direction of the arrow A, the wheels 23 rotate in the direction of the arrow A', and this rotation rotates the chain sprocket 25f in the direction of the arrow A" through the chain sprockets 25a, 25b, . . . 25e and the chains 27a, 27b and 27c, and thereby the belt conveyor pulley 22c rotates, resulting in rotation of the belt conveyor 22, so that the paper tube assembly P on the belt conveyor 22 progresses in the direction of the arrow B. 8 is a paper tube supply device, in which a fixed plate 28 is fixed on the machine frame 21 at the forward end of the belt conveyor 22, and rotary rollers 9, 10 and 13, 14 are fixed on shafts 9', 10' and 13', 14' respectively and rotatably journalled on the fixed plate 28, said rollers being covered by an elastic body 11 such as sponge on the peripheries thereof and mounted opposite to each other with an interval therebetween which permits nipping one piece of the paper cylinders 1 therebetween. Also, the rollers 9, 13 and 10, 14 have a suitable interval therebetween respectively. The belts 15, 16 are stretched between the rotary rollers 9, 13 and between the rotary rollers 10, 14, respectively, and rotated in the direction of the arrow and the paper tube supply path 17 is formed between the belts 15, 16. The separating rollers 18a, 19a covered by the elastic body 11 on their peripheries are oppositely mounted at an interval from the exit of the paper tube supply path 17 and mounted on the machine frame 21 so as to incline to the rotary rollers 13, 14 at an angle so that the paper tube 1 contacting with said separating rollers 18a, 19a is applied with a pulling-out force on its upper and lower ends at different times. In the case of locating the separating rollers 18a, 19a opposite to the rollers 13, 14, in order to ensure the separation it is preferable that the center distance (D) therebetween is below two times of a unit length (L) which is the breadth of the paper tube 1 plus respective halves of the breadth of the forward and rearward connecting portions of this paper tube.

29 is a bevel gear which is fixed on the lower end of the shaft 10' of the rotary roller 10 and engaged with a bevel gear (not shown) mounted on the shaft 26b correspondingly, and also a bevel gear (not shown) is also mounted on the lower end of the shaft 9' of the rotary roller 9 and engaged with a bevel gear (not shown) mounted on the shaft 26b corresponding thereto. The bevel gear (not shown) of the shaft 26b driving the bevel gears 29 of the shafts 10' and 9' is arranged so as to rotate the shafts 10', 9' in the opposite directions, and the rollers 10, 9 are rotated in the direction of the arrow through the rotation of the shaft 26b. Also, owing to the rotation of the shaft 26b the belts 15, 16 rotate through the rotary rollers 9, 10. Between the gear 30 mounted on the shaft 10' and the gear 31 mounted on the shaft 19a' of the separating roller 19a and between the gear 30 mounted on the shaft 9' and the gear 31 mounted on the shaft 18a' of the separating roller 18a chains 32, 32 are respectively stretched, thereby rotating the separation rolls 18a, 19a in the arrow direction. As a result of the above construction, the rotary rollers 9, 10 rotate by the rotation of the wheel 23, and thereby the belts 15, 16 rotate, so that the paper tube assembly P progresses on the paper tube supply path 17 in a row successively. When the leading paper tube 1a reaches the exit of the paper tube path 17 and contacts to the separation rollers 18a, 19a, as described above, since the rotary rollers 13, 14 and the separating-rolls 18a, 19a are located at an interval of D≦2L, the leading paper tube 1a is nipped and forward between the separating-rolls 18a, 19a under the situation wherein the second paper tube 1b is firmly nipped between the rotary rollers 13, 14. In this case, since the peripheral speed of the lower portions of the separating-rolls 18a, 19a is larger than the supply speed of the seedling row as described above, the leading paper cylinder 1a is applied with a force tending to pull apart it from the second paper cylinder 1b, and also since the separating-rolls 18a, 19a are inclined toward the backward direction of the transplanting machine, time points to apply the pulling action change in the course of time with displacing from the lower portions of the rollers to the upper portions thereof, the force acting between the paper tube 1a and the paper tube 1b becomes larger at the upper portion and smaller at the lower portion at a point of time, so that the connecting portion 3 moves its separation acting point downward in the course of time progressively via the separation guide portion 4 provided adjacent to the upper edge of the connecting body thereby causing V-shaped separation of the connecting body surely.

The speed ratio of the linear speed of the belts 15, 16 resulting from the rotary rollers 9, 10 and 13, 14, respectively, to the separating-rolls 18a, 19a can be easily determined by the ratio of rotation of the chain sprockets 30, 30 to the chain sprockets 31, 31 mounted on their respective shafts 9', 10' and 18a', 19a'. Upon pulling-out of this paper tube assembly seedlings in a row, the front line of the pulling-out of the seedlings retires as the separation of the paper tubes proceeds successively so that the distance from the paper tube separating device 8 becomes larger, with the result that the resistance of the pulling-out of paper tubes may become large and the paper tube row on the conveyor 22 may fall down or may cut off on the way. Accordingly, in order to hold the distance between the foremost line of the paper tube assembly P on the belt conveyor 22 and the paper tube separation device 8 constant thereby removing said drawback, the ratio of rotation of the bevel gears 29 for rotating the rotary rollers 9, 10 to the chain sprocket 25f fixed on the shaft 22a for rotating the pulley 22c of the belt conveyor 22 is set to a preselected value so that the distance between the front line of the pulling-out of paper tube and the separation device 8 is made constant. Namely, since the linear speed ratio of the belts 15, 16 of the paper tube supply path 17 to the belt conveyor 22 is determined by the ratio of the whole length of the paper tube row pulled out per one row to the progressing distance of the paper tube per one row, the rotary ratio of said bevel gear 29 to the chain sprocket 25f can be determined corresponding to this ratio.

The seedling delivery tube 20 is fixed to the machine frame 21 directly below the separating rollers 18a, 19a and has a receiving mouth of circular or angular shape in section, and a seedling limiter 33 having a height substantially the same as that of the separating rollers 18a, 19a is connected to the outer edge portion of the upper receiving mouth of the delivery tube 20 so that the paper tube 1 separated by the separating rollers 18a, 19a is positively guided into the receiving mouth of the seedling delivery tube 20 as it is in standing position and dropped as it is. 34 is a first seedling control body for guidance connected to the lower portion of the seedling delivery tube 20. Said control body 34 is composed of a tube body or a plate body having a flat or curved surface with an upward sliding surface and is mounted at a preselected angle $\alpha$ in the progressing direction of the transplanting machine. Thus the paper tube seedlings naturally dropped through the seedling delivery tube 20 slidingly drop down with the side face of the paper tube slidingly contacted with the upper surface of the control body 34.

35 is a second seedling control plate which is mounted opposite to the exit 34a of the first seedling control body 34 and mounted at the back portion of an opener 36 attached to the forward end of the support rod 37 fixed to the machine frame 21 in front of the seedling delivery tube 20 with an inclination. The upper end of the second seedling control plate 35 is opposite to the first seedling control body 34 and the lower end thereof has a length corresponding to the depth of the furrow of the opener 36. It is adapted to receive the paper tube seedlings slidingly dropped from the exit 34a of the first seedling control body and is composed of a plate body having a flat plane directed downward as its slidingly contacting face or a curved body having such contacting surface. The inclination angle $\beta$ of the second seedling control plate 35 is larger than the inclination angle $\alpha$, and thereby the paper tube seedlings dropped from the exit 34a of the first seedling control plate are suitably guided to the field and always placed thereon at a constant angle thereto. The second seedling control plate 35 may be attached directly to the back face of the opener 36 or alternatively, may be mounted behind the opener 36 at an appropriate interval therefrom. In the case above described, the first seedling control body 34 and the second seedling control plate 35 are mounted quite separately, individually, but these first and second seedling control bodies 34 and may be composed of one tube body formed by connecting them together and each having an exit corresponding portion as a given position. The second seedling control plate may be a slit body if the paper tube 1 can slide thereon, and the paper cylinder 1 is always controlled by said second seedling control plate 35 for having a constant position and thus placed on the field and at the same time soil formed with a furrow by means of the opener 36 is again returned and said paper tube is buried by said returned soil almost vertically thereby completing the transplanting of the paper tube.

38 is a disc colter which is rotatably supported by a shaft 40 on a bracket 39 fixed to the support rod 37 and mounted near the front of the opener 36 and adapted to prevent the intertwining of trash such as thin roots of plants included in the soil of the field which gives obstruction at the time of producing a cut furrow by means of the opener 36.

As the paper tube assembly which can be used in the present invention, there may be used ones, such as an assembly (11-a) wherein two films 2a, 2a' are pasted together by means of a water-proof paste 41 as a method of connecting between the paper tubes 1, 1 as shown in FIG. 11, an assembly (11-b,c) wherein the connection is made by one film 2a, an assembly (11-d,f) wherein the overlapped portion of two films 2a, 2a' is partly pasted by means of a water-proof paste 41 and an assembly (11-e,g) wherein the paper tubes are directly pasted together by means of a water-proof paste 41 without using the film 2a or 2a' etc. These connecting methods of the paper tubes have been publicly known, and even if such constructions using said publicly known methods are adopted, it is possible to attain approximately the same effects as those described above. Also, in the connecting methods 11-d, e by means of paste, the distribution of the joined portions may be such that the joined portions are distributed slenderly continuously over the length of a defined range in the direction of the height of the pot body 1 thereby attaining approximately the same object.

As described above, the present invention has completed a full automatic separation and transplanting of plant seedlings by means of a continuous paper tube assembly in a very economical system, which could not be realized heretofore, and as a result the productivity of agricultural labor can be greatly elevated.

Hereinafter, embodiments of the present invention will be explained.

EXAMPLE 1

Kraft paper of 60 g/m$^2$ was applied with hydrated solution of copper 8-hydroxyquinolinolate having 1% of the component on the surface and dried to make rot-proof paper, and two sheets of this paper were pasted together to make paper tubes for beet of hexagonal cross-section having a longer diameter of 1.9 cm and a height of 13 cm when developed. These paper tubes were connected by pasting breadth of 0.95 mm and had a separation guide portion (slit) of 4 cm extending from the upper end in the height direction of the paper tube in the center of the connecting portion, and had joined portions of 6 mm on the lower portion of 9 cm at the rate of one in every 3 cm and the remaining portion as the separation line. Ten of these paper tubes were arranged into a lateral row and connected together, and then the next ten paper tubes were overlapped thereto with an offset of a half pitch of the paper tube and pasted together by means of a water soluble paste and, like this, 140 rows of the paper tubes were laminated thereby making a unit of the paper tube assembly including 1400 paper tubes, and thus a number of the units were produced.

In such paper tubes, sugar beet were raised in a cold bed, and these paper tube assembly seedlings were put on the belt conveyor 22 of the transplanting machine as shown in FIG. 7, the wheels 23, the shafts 9', 10' of the rotary rollers 9, 10 and the shafts 18a', 19a' of the separating rollers 18a, 19a were drivingly connected by means of the chain 32, and furrows were produced by means of the opener, and said 1400 paper tubes were pulled out from one end thereof by means of the rotary rollers, and a pair of separation mechanisms were arranged in front of said rotary rollers said rotary rollers having the peripheral speed of 9 cm/sec., said separation mechanism having the separating rollers having the linear speed ratio of the upper end to the lower end of 2:1, the lower end having a peripheral speed of about 9 cm/sec. These separating rollers were covered by sponge on the surface thereof. A unit of 1400 of the separated seedlings were transplanted at a speed of 0.9 m/sec. by means of a device for planting them into the field through the seedling delivery tube 20 and the first seedling control body 34 under control by the second seedling control plate 35 as they were. As a result, the separation of the seedlings was attained very smoothly, and perfect automatic mechanical separation was performed without cutting-off of the connecting portions on the way thereof, and there was no mechanical damage of the seedlings and almost all of the paper tube seedlings were planted in the field in the vertical position.

EXAMPLE 2

Using the same paper material as that in Example 1, a large number of units of the paper tube assembly were made, each unit including a total of 700 paper tubes, having 7 paper tubes ×100 rows, wherein each developed paper tube for cone had a regular hexagonal shape in section having a longer diameter of 3 cm and a length of 10 cm, and these were assembled into an assembled paper tube body. The connecting portion between the pots was such that except for 3.5 cm from the upper end, the joined portion of 6 mm was distributed by dividing it into the equal parts over the lower portion of 6.5 cm.

After nursing sweet cone in these paper tubes, the paper tube assembly was put on the carrier in a lump without breaking it, and the seedling rows were pulled out by means of the transplanting machine which was similar to that in Example 1, but as the separating mechanism in front of the guide rotors a pair of rotary cylindrical bodies, instead of the cone shape in Example 1, were parallel disposed with an interval of 1.6 cm at the lower portions thereof and inclined at about 15° to the progressing direction of the seedling rows, said cylindrical bodies each having a diameter of 4 cm and a height of 12 cm and urethane sponge applied on the surface thereof; 700 of the paper tubes were transplanted at the speed of 0.9 m/sec., fully automatically, with the result that the separation was perfect and the transplanting was perfect in the rate of 100%.

What is claimed is:

1. An apparatus for separating and transplanting continuous paper tube seedlings from a continuous paper tube strip assembly having a plurality of vertical paper tubes having an open top and bottom and each having a seedling which has been nursed therein, each of said tubes being connected to the adjacent tube by means of a connecting portion to form a strip of tubes, said strip being assembled into a row state by folding right and left, alternatively, at every preselected length thereof, each of said connecting portions having a separating line therein at which it is desired to separate individual tubes prior to transplanting, said separating lines having a separation-guide-portion provided at the upper or lower end or both ends of each said separating line, said separation-guide-portion comprising a continuous unjoined portion of 20–70% of the height of said connecting portion, the remainder of said separating line having a plurality of joined portions distributed thereon between unjoined portions, the apparatus comprising:

a seedling tube feed means for continuously pulling the strip of tubes out of the row state and for guiding said strip of tubes in a linear direction, said seedling tube feed means comprising at least one pair of rotating bodies mounted vertically and each roller of each pair being rotated in the opposite direction than the other roller of each pair and being covered with an elastic body on the periphery thereof;

a seedling tube separating means for separating individual tubes from the strip of tubes at the separating lines thereof, said seedling tube separating means comprising a pair of rollers mounted downstream of said seedling tube feed means in the direction of linear movement of the strip of tubes, said pair of rollers being a pair of obliquely mounted cylindrical rollers, said cylindrical rollers having a peripheral speed faster than that of said rotating bodies and being covered with an elastic body on the peripheries thereof, and wherein each roller rotates in the opposite direction from the other, whereby an instantaneous mechanical pulling force is applied to the connecting portion of said paper tube seedlings through a nipping action thereby causing tearing-off thereof from the separation-guide-portion;

guide means for guiding the separated seedling tubes into the ground, said guide means comprising:

a seedling dropping tube, having a receiving mouth at the top and an outlet at the bottom thereof, said seedling dropping tube being mounted below and immediately downstream of said seedling tube separating means, for receiving seedling tubes separated thereby, and seedling control means beneath the outlet of said seedling dropping tube for controlling the orientation of the seedling tubes received from said seedling dropping tube such that the seedling tubes land in the ground at a predetermined angle; and opener means for furrowing the ground when the apparatus progresses.

2. An apparatus in accordance with claim 1, further including:

a seedling tube assembly conveyor means for conveying the assembled row-state assembly of seedling tubes toward said seedling tube feed means as the strip of tubes are fed through said seedling tube feed means and gear means for maintaining the linear speed of said seedling tube assembly conveyor means at a constant ratio to the linear speed of said seedling tube feed means.

3. An apparatus in accordance with claim 1 wherein said seedling control means comprises a first seedling control body, having an inlet disposed beneath the outlet of said seedling dropping tube, an outlet, and an upwardly directed flat or curved sliding face for engaging separated seedling tubes when in use, said first seedling control body being disposed so as to incline in a vertical plane at a predetermined angle to the forward direction of progress of the apparatus, and a second seedling control body disposed opposite the outlet of said first seedling control body in a manner to control the dropping direction and position of the seedling tubes with an angle in the same plane as and greater than the angle of inclination of said first seedling control body, said second seedling control plate having a downwardly directed flat or curved sliding face for engaging separated seedling tubes when in use.

4. An apparatus in accordance with claim 1 wherein said guide means further includes:

a seedling limiter disposed above said seedling dropping tube.

5. An apparatus in accordance with claim 4 wherein said seedling limiter is integral with the receiving mouth of said seedling dropping tube.

6. An apparatus in accordance with claim 4 wherein said seedling limiter has substantially the same height as said rollers of said seedling tube separating means.

7. An apparatus for separating and transplanting continuous paper tube seedlings from a continuous paper tube strip assembly having a plurality of vertical paper tubes having an open top and bottom and each having a seedling which has been nursed therein, each of said tubes being connected to the adjacent tube by means of a connecting portion to form a strip of tubes, said strip being assembled into a row state by folding right and left, alternatively, at every preselected length thereof, each of said connecting portions having a separating line therein at which it is desired to separate individual tubes prior to transplanting, said separating lines having a separation-guide-portion provided at the upper or lower end or both ends of each said separating line, said separation-guide-portion comprising a continuous unjoined portion of 20-70% of the height of said connecting portion, the remainder of said separating line having a plurality of joined portions distributed thereon between unjoined portions, the apparatus comprising:

a seedling tube feed means for continuously pulling the strip of tubes out of the row state and for guiding said strip of tubes in a linear direction, said seedling tube feed means comprising at least one pair of rotating bodies mounted vertically and each roller of each pair being rotated in the opposite direction than the other roller of each pair and being covered with an elastic body on the periphery thereof;

a seedling tube separating means for separating individual tubes from the strip of tubes at the separating lines thereof, said seedling tube separating means comprising a pair of rollers mounted downstream of said seedling tube feed means in the direction of linear movement of the strip of tubs, said pair of rollers being a pair of conical rollers, said conical rollers having a peripheral speed faster than that of said rotating bodies and being covered with an elastic body on the peripheries thereof, and wherein each roller rotates in the opposite direction from the other, whereby an instantaneous mechanical pulling force is applied to the connecting portion of said paper tube seedlings through a nipping action thereby causing tearing-off thereof from the separation-guide-portion;

guide means for guiding the separated seedling tubes into the ground, said guide means comprising:

a seedling dropping tube, having a receiving mouth at the top and an outlet at the bottom thereof, said seedling dropping tube being mounted below and immediately downstream of said seedling tube separating means, for receiving seedling tubes separated thereby, and seedling control means beneath the outlet of said seedling dropping tube for controlling the orientation of the seedling tubes received from said seedling dropping tube such that the seedling tubes land in the ground at a predetermined angle; and opening means for furrowing the ground when the apparatus progresses.

8. An apparatus in accordance with claim 7, further including:

a seedling tube assembly conveyor means for conveying the assembled row-state assembly of seedling tubes toward said seedling tube feed means as the strip of tubes are fed through said seedling tube feed means; and gear means for maintaining the linear speed of said seedling tube assembly conveyor means at a constant ratio to the linear speed of said seedling tube feed means.

9. An apparatus in accordance with claim 7 wherein said seedling control means comprises a first seedling control body, having an inlet disposed beneath the outlet of said seedling dropping tube, an outlet, and an upwardly directed flat or curved sliding face for engaging separated seedling tubes when in use, said first seedling control body being disposed so as to incline in a vertical plane at a predetermined angle to the forward direction of progress of the apparatus, and a second seedling control body disposed opposite the outlet of said first seedling control body in a manner to control the dropping direction and position of the seedling tubes with an angle in the same plane as and greater than the angle of inclination of said first seedling control body, said second seedling control plate having a downwardly directed flat or curved sliding face for engaging separated seedling tubes when in use.

10. An apparatus in accordance with claim 7, wherein said guide means further includes:
a seedling limiter disposed above said seedling dropping tube.

11. An apparatus in accordance with claim 10 wherein said seedling limiter is integral with the receiving mouth of said seedling dropping tube.

12. An apparatus in accordance with claim 10 wherein said seedling limiter has substantially the same height as said rollers of said seedling tube separating means.

* * * * *